(12) United States Patent
Srisooksai et al.

(10) Patent No.: US 12,537,721 B2
(45) Date of Patent: Jan. 27, 2026

(54) LEARNING MODEL GENERATION METHOD, INFERENCE APPARATUS, AND WIRELESS TRAIN CONTROL SYSTEM

(71) Applicant: KYOSAN ELECTRIC MFG. CO., LTD., Yokohama (JP)

(72) Inventors: Tossaporn Srisooksai, Machida (JP); Satoshi Nishida, Kawasaki (JP); Shuji Nambu, Yokohama (JP)

(73) Assignee: KYOSAN ELECTRIC MFG. CO., LTD., Yokohama (JP)

( * ) Notice: Subject to any disclaimer, the term of this patent is extended or adjusted under 35 U.S.C. 154(b) by 937 days.

(21) Appl. No.: 17/738,434

(22) Filed: May 6, 2022

(65) Prior Publication Data
US 2022/0263688 A1    Aug. 18, 2022

Related U.S. Application Data

(63) Continuation of application No. PCT/JP2020/041095, filed on Nov. 2, 2020.

(30) Foreign Application Priority Data

Nov. 27, 2019   (JP) ................................. 2019-213876

(51) Int. Cl.
*H04L 25/02*     (2006.01)
*B61L 3/12*      (2006.01)
(Continued)

(52) U.S. Cl.
CPC ............ *H04L 25/0254* (2013.01); *B61L 3/12* (2013.01); *G06N 3/045* (2023.01); *H04B 17/336* (2015.01);
(Continued)

(58) Field of Classification Search
CPC .... H04L 25/0254; H04L 27/0006; B61L 3/12; B61L 27/53; B61L 27/70;
(Continued)

(56) References Cited

U.S. PATENT DOCUMENTS 8,566,264 B2    10/2013  Maximilian et al.
2023/0062443 A1  3/2023  Chakraborty et al.

FOREIGN PATENT DOCUMENTS

CN   108712748 A    10/2018
JP   2010-515181 A   5/2010
(Continued)

OTHER PUBLICATIONS

Li Kaicheng et al., "Cooperative and cognitive wireless networks for train control systems", Wireless Networks, ACM, 2 Penn Plaza, Suite 701—New York USA, vol. 21, No. 8, Mar. 22, 2015, pp. 2545-2559 [retrieved on Mar. 22, 2015] (Year: 2015).*

(Continued)

*Primary Examiner* — Chae S Lee
(74) *Attorney, Agent, or Firm* — Muncy, Geissler, Olds & Lowe, P.C.

(57) ABSTRACT

A communication status inference apparatus acquires a wireless signal as data indicating a radio wave environment of a wireless base station installed along a railway line when an onboard system and the wireless base station perform cognitive wireless communication, the wireless signal being received by a monitoring reception apparatus in the vicinity of the wireless base station, and executes an inference process of inputting the acquired data indicating the radio wave environment to a communication status inference model and outputting frequency-specific communication status information based on a signal-to-noise ratio (SNR) at which the wireless base station performed wireless communication under the radio wave environment. The communi- (Continued)

cation status inference model is a machine learning model that has undergone learning using training data with the data indicating the radio wave environment as an input and with the frequency-specific communication status information based on the SNR as an output.

9 Claims, 6 Drawing Sheets

(51) Int. Cl.
    *G06N 3/045*       (2023.01)
    *H04B 17/336*     (2015.01)
    *H04B 17/391*     (2015.01)
    *H04W 16/18*      (2009.01)
    *H04W 48/16*      (2009.01)
    *H04W 4/42*        (2018.01)
    *H04W 72/541*    (2023.01)

(52) U.S. Cl.
    CPC .......... *H04B 17/391* (2015.01); *H04W 16/18* (2013.01); *H04W 48/16* (2013.01); *H04W 4/42* (2018.02); *H04W 72/541* (2023.01)

(58) Field of Classification Search
    CPC .............. B61L 2027/204; G06N 3/045; G06N 3/0464; H04B 17/336; H04B 17/391; H04B 17/3912; H04W 16/18; H04W 48/16; H04W 4/42; H04W 72/541; H04W 16/14
    See application file for complete search history.

(56) References Cited

FOREIGN PATENT DOCUMENTS

| | | | |
|---|---|---|---|
| JP | 2013-239935 A | 11/2013 | |
| JP | 2018-142957 A | 9/2018 | |
| KR | 20170112461 A | * 10/2017 | .......... B61L 15/0027 |

OTHER PUBLICATIONS

Yu, F. Richard et al. (Advances in Communications—Based Train Control Systems, CRC Press Taylor & Francis Group, 6000 Broken Sound Parkway NW, Suite 300, Boca Raton, FL 33487-2742, © 2016 by Taylor & Francis Group, LLC, hereinafter "Yu") (Year: 2016).*
Zheng et al. "Big Data Processing Architecture for Radio Signals Empowered by Deep Learning: Concept, Experiment, Applications and Challenges", IEEE, vol. 6, 2018, Science and Technology on Communication Information Security Control Laboratory, Jiaxing 314033, China. (Year: 2018).*
English Translation of International Search Report of the corresponding International Application No. PCT/JP2020/041095 mailed Feb. 2, 2021.
The extended European search report of the corresponding EP application No. 20892876.2 dated Nov. 20, 2023.
Li Kaicheng et al, "Cooperative and cognitive wireless networks for train control systems", Wireless Networks, ACM, 2 Penn Plaza, Suite 701—New York USA, vol. 21, No. 8, Mar. 22, 2015, pp. 2545-2559 [retrieved on Mar. 22, 2015].
The corresponding IN application No. 201941019899A filed on May 20, 2019 (Family of US20230062443A1 disclosed herein).

* cited by examiner

FIG.3

[CLASSIFICATION OF FREQUENCY-SPECIFIC COMMUNICATION STATUS]

| | CLASS | CONDITION |
|---|---|---|
| | BLACK(B) | $C_0 < SNR$ |
| | GRAY(G) | $0 < SNR \leqq C_0$ |
| | SILVER(S) | $C_1 \leqq SNR \leqq 0$ |
| | WHITE(W) | $SNR < C_1$ |

# LEARNING MODEL GENERATION METHOD, INFERENCE APPARATUS, AND WIRELESS TRAIN CONTROL SYSTEM

CROSS REFERENCE TO RELATED APPLICATION

This application is a continuation of International Patent Application No. PCT/JP2020/041095, having an international filing date of Nov. 2, 2020, which designated the United States, the entirety of which is incorporated herein by reference. Japanese Patent Application No. 2019-213876 filed on Nov. 27, 2019 is also incorporated herein by reference in its entirety.

BACKGROUND

The present disclosure relates to a learning model generation method for generating a machine learning model, an inference apparatus, and a wireless train control system.

In a wireless train control system called Communication-based Train Control (CBTC) utilizing wireless communication for train control, contemplated is the use of frequency bands called Industrial Scientific and Medical (ISM) bands requiring no license for wireless communication between ground vehicles. There are various wireless communication standards using the ISM bands, such as wireless LAN (IEEE802.11) and Bluetooth (registered trademark) (IEEE802.15.1). These standards are utilized in various other wireless communication systems, and it is thus inevitable to receive interference from the other systems. As a technique for improving the reliability of wireless communication by reducing the influence of interference, for example, Japanese Unexamined Patent Application Publication No. 2013-239935 discloses a technique for changing the channel of wireless communication based on a frequency hopping pattern table.

However, according to the above-described technique of Japanese Unexamined Patent Application Publication No. 2013-239935, it is necessary to perform actual communication between the base station and the onboard system (mobile station). Thus, there are issues of occupancy of channels of wireless communication including retransmission and of how to find beforehand a vacant wireless communication channel. For wireless communication utilizing the ISM bands, there is a technique called cognitive wireless communication by which to search for a vacant wireless communication channel and switch to a wireless communication system to be used. In the cognitive wireless communication, spectrum sensing is required to search for a vacant wireless communication channel. However, in order to apply cognitive wireless communication to a wireless train control system in which high reliability is sought, higher accuracy is required for spectrum sensing as well.

BRIEF DESCRIPTION OF THE DRAWINGS

FIG. 3 is a diagram illustrating an example of classification of frequency usage status in frequency-specific communication status information.

DESCRIPTION OF EXEMPLARY EMBODIMENTS

Figure 1:
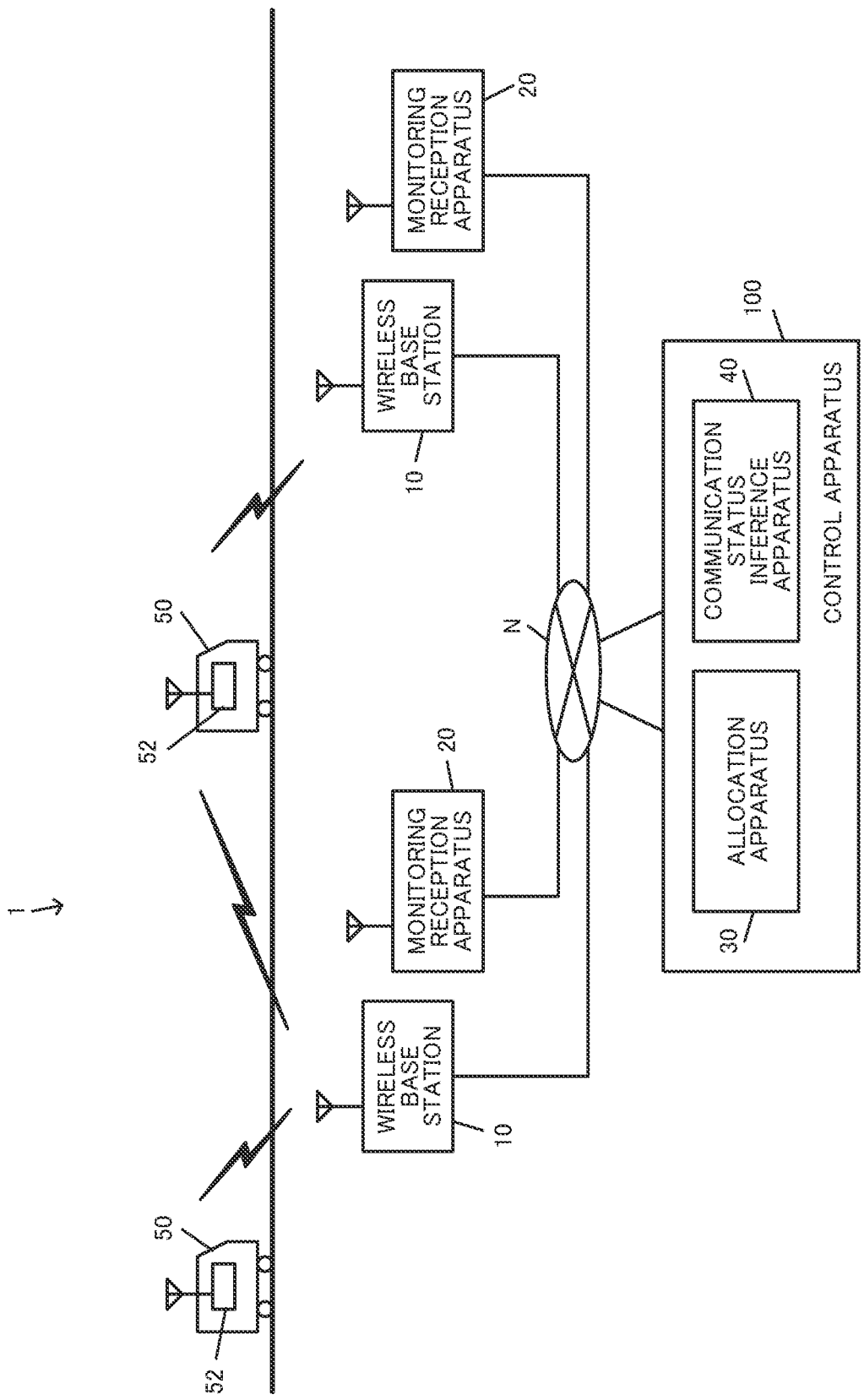
FIG. 1 is a diagram illustrating a configuration example of a wireless train control system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

The present disclosure is made in view of the above circumstances, and an object of the present disclosure is to provide a high-accuracy novel spectrum sensing technique to be applied to a wireless train control system performing cognitive wireless communication.

A first aspect to solve the above-described issues is
a learning model generation method executed by a computer system,
the computer system executing:
acquiring training data in which data indicating a radio wave environment of a wireless base station installed along a railroad line when an onboard system and the wireless base station perform cognitive wireless communication allowing for switching among wireless communication standards is associated with frequency-specific communication status information based on a signal-to-noise ratio (SNR) at which the wireless base station performed wireless communication under the radio wave environment; and
generating a machine learning model using the training data, with the data indicating the radio wave environment as an input and with the frequency-specific communication status information as an output.

As a result, in the first aspect, it is possible to realize a high-accuracy spectrum sensing technique to be applied to a wireless train control system performing cognitive wireless communication. That is, it is possible to generate a machine learning model with the data indicating the radio wave environment of the wireless base station when the wireless base station and the onboard system in the wireless train control system perform cognitive wireless communication as an input and with the frequency-specific communication status information based on the SNR at which the wireless base station performed wireless communication under the radio wave environment as an output. Then, utilizing this machine learning model achieves high-accuracy spectrum sensing.

The learning model generation method may be configured such that the training data further includes associated wireless communication standards used by the wireless base station under the radio wave environment, the machine learning model includes a first learning model and second learning models for the corresponding wireless communication standards, and the generating includes:

generating the first learning model using the training data, with the data indicating the radio wave environment as an input and with the wireless communication standards as an output; and generating the second learning models for the corresponding wireless communication standards using the training data, with the data indicating the radio wave environment as an input and with the frequency-specific communication status information as an output.

As a result, in some embodiments, it is possible to generate the machine learning model to include the first learning model with the data indicating the radio wave environment as an input and with the wireless communication standards as an output and the second learning models for the corresponding wireless communication standards with the data indicating the radio wave environment as an input and with the frequency-specific communication status information as an output. Since the communication status may vary with different wireless communication standards, it is possible to improve the accuracy of spectrum sensing utilizing the machine learning model.

A second aspect of the present disclosure is an inference apparatus including:

a radio wave environment data acquisition section that acquires data indicating a radio wave environment of a wireless base station installed along a railroad line when an onboard system and the wireless base station perform cognitive wireless communication allowing for switching among wireless communication standards; and an inference process execution section that executes an inference process of inputting the data indicating the radio wave environment acquired by the radio wave environment data acquisition section to a machine learning model that has undergone learning using training data with the data indicating the radio wave environment as an input and with frequency-specific communication status information based on a signal-to-noise ratio (SNR) at which the wireless base station performed wireless communication under the radio wave environment as an output, and outputting the frequency-specific communication status information.

As a result, in the second aspect, it is possible to realize a high-accuracy spectrum sensing technique to be applied to a wireless train control system performing cognitive wireless communication. That is, it is possible to achieve high-accuracy spectrum sensing utilizing a machine learning model, such as executing an inference process of inputting the data indicating the radio wave environment of the wireless base station when the wireless base station and the onboard system in the wireless train control system perform cognitive wireless communication to the machine learning model and outputting the frequency-specific communication status information based on the SNR at which the wireless base station performed wireless communication under the radio wave environment.

The inference apparatus may be configured such that the training data further includes associated wireless communication standards used by the wireless base station under the radio wave environment, the machine learning model includes a first learning model and second learning models for the corresponding wireless communication standards, and the inference process execution section has:

a first inference process execution section that, using the training data, executes a first inference process of inputting the data indicating the radio wave environment acquired by the radio wave environment data acquisition section to the first learning model having undergone learning with the data indicating the radio wave environment as an input and with the wireless communication standard to be used by the wireless base station under the radio wave environment as an output, and outputting the wireless communication standard; and a second inference process execution section that, using the training data, executes a second inference process of selecting the second learning model matching the wireless communication standard output by the first inference process execution section from among the second learning models for the corresponding wireless communication standards having undergone learning for the corresponding wireless communication standards with the data indicating the radio wave environment as an input and with the frequency-specific communication status information as an output, inputting the data indicating the radio wave environment acquired by the radio wave environment data acquisition section to the selected second learning model, and outputting the frequency-specific communication status information.

As a result, in some embodiments, the machine learning model includes: the first learning model with the data indicating the radio wave environment as an input and with the wireless communication standards as an output; and the second learning models for the wireless communication standards with the data indicating the radio wave environment as an input and with the frequency-specific communication status information as an output. Since the communication status may vary with different wireless communication standards, the accuracy of spectrum sensing can be improved by utilizing this machine learning model.

The inference apparatus may be configured such that the training data further includes associated wireless propagation characteristics according to the wireless communication standards used by the wireless base station under the radio wave environment, the second learning models are present for corresponding combinations of the wireless communication standard and the wireless propagation characteristic, the first learning model is a model that has undergone learning with the data indicating the radio wave environment as an input and with the wireless communication standard used by the wireless base station under the radio wave environment and the wireless propagation characteristics according to the wireless communication standards as an output, the first inference process execution section executes the first inference process of inputting the data indicating the radio wave environment acquired by the radio wave environment data acquisition section to the first learning model and outputting a combination of the wireless communication standard and the wireless propagation characteristic, and the second inference process execution section executes the second inference process of selecting the second learning model matching the combination output by the first inference process execution section, inputting the data indicating the radio wave environment acquired by the radio wave environment data acquisition section to the selected second learning model, and outputting the frequency-specific communication status information.

As a result, in some embodiments, the machine learning model includes: the first learning model with the data indicating the radio wave environment as an input and with the combination of the wireless communication standard and the wireless propagation characteristic as an output; and the second learning models for the corresponding combinations of the wireless communication standard and the wireless propagation characteristic with the data indicating the radio wave environment as an input and with the frequency-specific communication status information as an output. Since the communication status may vary with different combinations of the wireless communication standard and the wireless propagation characteristic according to the wireless communication standard, the accuracy of spectrum sensing can be improved by utilizing a multi-stage machine learning model using the second learning model matching the inferred combination in the first learning model.

The inference apparatus may be configured such that the machine learning model is a convolution neural network.

As a result, in some embodiments, a machine learning model is generated from a convolution neural network.

The inference apparatus may be configured such that the radio wave environment data acquisition section acquires the data indicating the radio wave environment, based on a wireless signal received by a monitoring reception apparatus installed along the railroad line.

As a result, in some embodiments, the monitoring reception apparatus is installed separately from the wireless base station. This makes it possible to acquire the data indicating the radio wave environment of the wireless base station without influence on the wireless communication between the onboard system and the ground base station. The monitoring reception apparatus can be installed at an arbitrary position such as in the vicinity of the wireless base station, for example.

A third aspect of the present disclosure is a wireless train control system including:
 the inference apparatus described above; and
 an allocation apparatus that dynamically allocates a wireless channel related to the cognitive wireless communication, based on the frequency-specific communication status information output from the inference process execution section of the inference apparatus.

As a result, in the third aspect, in the wireless train control system, it is possible to dynamically allocate a wireless channel related to the cognitive wireless communication between the wireless base station and the onboard system, based on the frequency-specific communication status information of the wireless base station inferred by the inference apparatus. This achieves high reliability of the wireless communication between ground vehicles.

Hereinafter, preferred embodiments of the present disclosure will be described with reference to the drawings. The present disclosure is not limited by the embodiments described below, and embodiments to which the present disclosure is applicable are not limited to the following embodiments. In the drawings, identical elements are denoted with identical reference numerals.

[System Configuration]

FIG. 1 is a diagram illustrating a configuration example of a wireless train control system 1 according to the present embodiment. As illustrated in FIG. 1, the wireless train control system 1 of the present embodiment includes wireless base stations 10, monitoring reception apparatuses 20, and a control apparatus 100. The control apparatus 100 is an apparatus that performs centralized management of operations of trains 50. The control apparatus 100 has an allocation apparatus 30 and a communication status inference apparatus 40 as the main apparatuses related to wireless control in the present embodiment. The wireless base stations 10 and the monitoring reception apparatuses 20 are installed along a railroad line. The control apparatus 100 is installed at a command center or the like. The apparatuses are communicably connected to one another via a terrestrial transmission line N.

Wireless communication between the wireless base stations 10 and onboard systems 52 mounted in trains 50 running on the railroad tracks is wireless communication using Industrial Scientific and Medical (ISM) bands such as 2.4-GHz band, 5.7-GHz band, and 920-GHz band. In the wireless communication, cognitive wireless communication is performed to search for a frequency not used by other communication systems and perform wireless communication while switching among the wireless communication standards and the wireless channels.

The plurality of wireless base stations 10 are installed along the railroad line such that their communicable ranges partially overlap to enable the onboard systems 52 in the trains 50 running on the railroad track to perform continuous wireless communication with the control apparatus 100. The wireless base stations 10 are capable of establishing communication channels with a predetermined number of trains 50 and perform wireless communication with the onboard systems 52 in the trains 50 via the wireless channels allocated under instructions from the allocation apparatus 30.

The monitoring reception apparatuses 20 are installed to acquire data indicating radio wave environments of the corresponding wireless base stations 10. The monitoring reception apparatuses 20 are installed in the vicinity of the corresponding wireless base stations 10, thereby to receive wireless signals around the wireless base stations 10, and output the received wireless signals to the communication status inference apparatus 40. Although FIG. 1 illustrates two wireless base stations 10 and two monitoring reception apparatuses 20, three or more each are actually installed along the railroad line.

The allocation apparatus 30 dynamically allocates wireless channels related to the cognitive wireless communication between the wireless base stations 10 and the onboard systems 52 in the trains 50, based on the communication status inferred by the communication status inference apparatus 40. For example, at handover between the wireless base stations 10, the allocation apparatus 30 selects and allocates a vacant frequency wireless channel based on the communication status around the next wireless base station 10 inferred in real time by the communication status inference apparatus 40. Then, the allocation apparatus 30 notifies the allocated wireless channel to the onboard system 52 in the train 50 and the wireless base station 10.

For each of the wireless base stations 10, the communication status inference apparatus 40 infers the communication status around the wireless base station 10 based on the wireless signal received by the corresponding monitoring reception apparatus 20.

[Inference of Communication Status]

Figure 2:
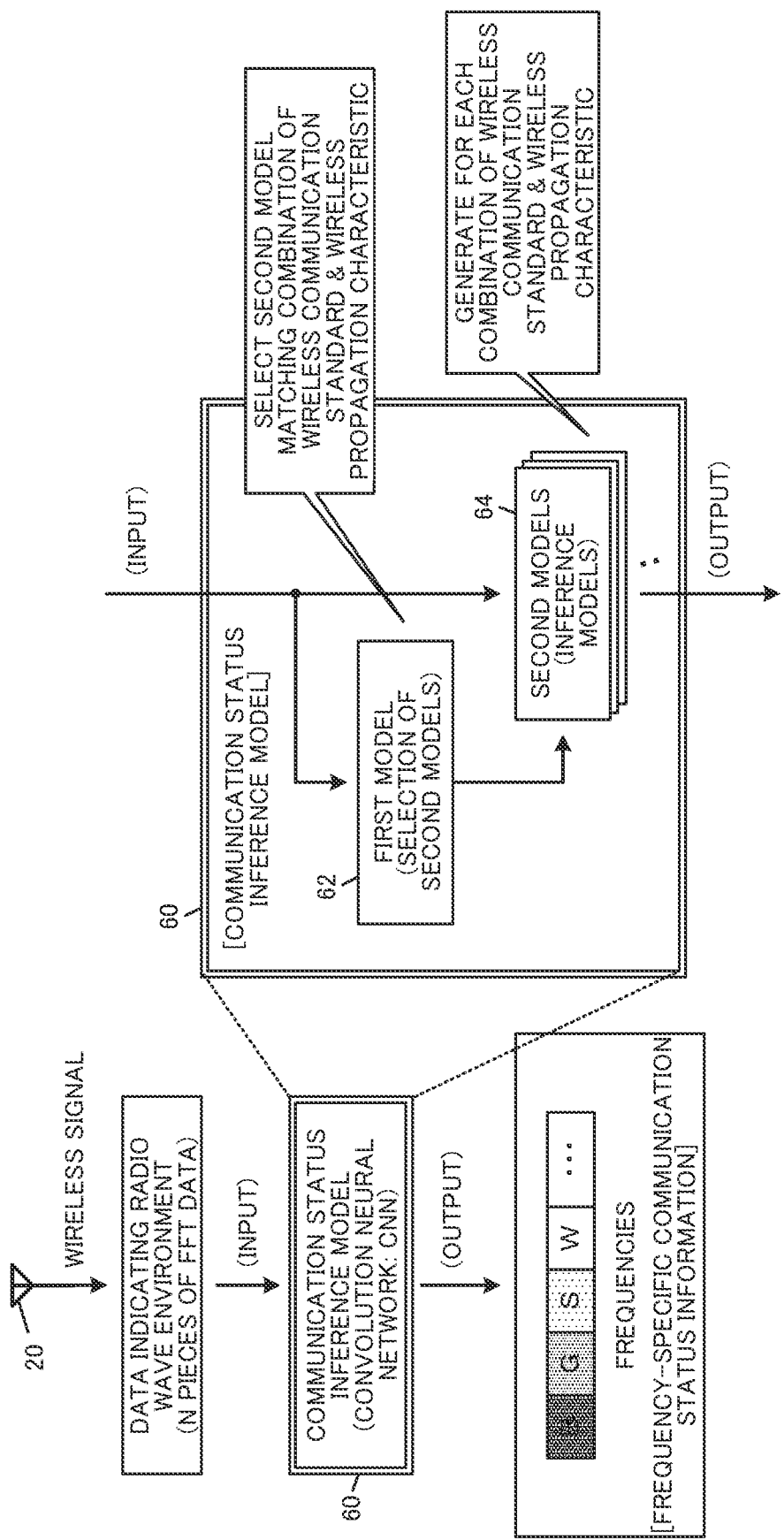
FIG. 2 is an explanatory diagram of inference of a radio wave environment using a communication status inference model.

FIG. 2 is a diagram describing inference of communication status by the communication status inference apparatus 40. As illustrated in FIG. 2, the communication status inference apparatus 40 performs spectrum sensing, that is, infers the frequency-specific communication status that is the communication status around the corresponding wireless base station 10 by using a communication status inference model 60, based on the wireless signal received by the monitoring reception apparatus 20. The communication status inference model 60 is generated for each wireless base station 10.

The communication status inference model 60 is implemented by a convolution neural network in the present embodiment, but may be implemented by another neural network. The communication status inference model 60 is a machine learning model that has undergone learning using training data as described later, and has a weight coefficient determined therefor. At the inference of the communication status using the communication status inference model 60, as the data indicating the radio wave environment, N pieces of data obtained by normalizing the amplitude and phase of a wireless signals received by the monitoring reception apparatus 20 and subjecting to a fast Fourier transform, instead of using a spectrogram of the wireless signal, are input to the communication status inference model 60. Each of the monitoring reception apparatuses 20 is installed in the vicinity of the corresponding wireless base station 10. Thus, the wireless signal received by the monitoring reception apparatus 20 can be regarded as the wireless signal received by the wireless base station 10. This significantly shortens the processing time required for inference of the communication status. Therefore, it is possible to realize the inference of the communication status that is near real-time inference or can be said to be real-time inference.

Then, the communication status inference model 60 outputs the frequency-specific communication status information around the monitoring reception apparatus 20 that has received the input wireless signal. This frequency-specific communication status information constitutes the communication status around the corresponding wireless base station 10. The frequency-specific communication status information is information indicating the communication status based on frequency by wireless channel. The communication status is classified into a plurality of stages based on the signal-to-noise ratio (SNR) at which the wireless base station 10 performed wireless communication under the wireless environment.

FIG. 3 illustrates an example of classification of communication status based on the SNR. FIG. 3 illustrates an example of classification into four levels of black (B), gray (G), silver (S), and white (W) in order of density. However, the classification may have three or less levels or may have five or more levels. The example of FIG. 3 indicates that, in a descending order of density, the SNR is greater, that is, the possibility of wireless communication being performed at the relevant frequency (the relevant frequency being used) is higher.

As illustrated in FIG. 2, the communication status inference model 60 includes a first model 62 and a plurality of second models 64. The first model 62 and the second models 64 are each implemented by convolution neural networks. That is, the communication status inference model 60 can be said to include the plurality of convolution neural networks.

The first model 62 is a learning model for selecting one of the plurality of second models 64, having the data indicating the radio wave environment as an input and the combination of the wireless communication standard to be used in the cognitive wireless communication and the wireless propagation characteristic of the wireless channel as an output.

Each of the second models 64 is a learning model that has the data indicating the radio wave environment as an input and the frequency-specific communication status information as an output, and is generated for each combination of the wireless communication standard and the wireless propagation characteristic of the wireless channel. The wireless communication standards include wireless communication standards that can be used while being switched in cognitive wireless communication in the present embodiment. Examples of the wireless communication standards include wireless LAN (Wi-Fi) communication standards such as IEEE802.11b/11a/11g/11n/11ac and near field communication standards such as Bluetooth. Examples of the wireless propagation characteristics include SNR, center frequency offset (CFO), sample rate offset (SRO), frequency selective fading, and power delay profile (PDP).

In the inference of the communication status using the communication status inference model 60, first, the data indicating the radio wave environment based on the wireless signal received by the monitoring reception apparatus 20 is input to the first model 62. In a first inference process using the first model 62, the combination of the wireless communication standard and wireless propagation characteristic matching the input data indicating the radio wave environment is output. Then, the second model 64 corresponding to the combination of the wireless communication standard and wireless propagation characteristic output from the first model 62 is selected. The data indicating the radio wave environment based on the wireless signal received by the monitoring reception apparatus 20 is input to the selected second model 64. In a second inference process using the second model 64, the frequency-specific communication status information matching the input data indicating the radio wave environment is output.

[Learning of the Communication Status Inference Model]

Figure 4:
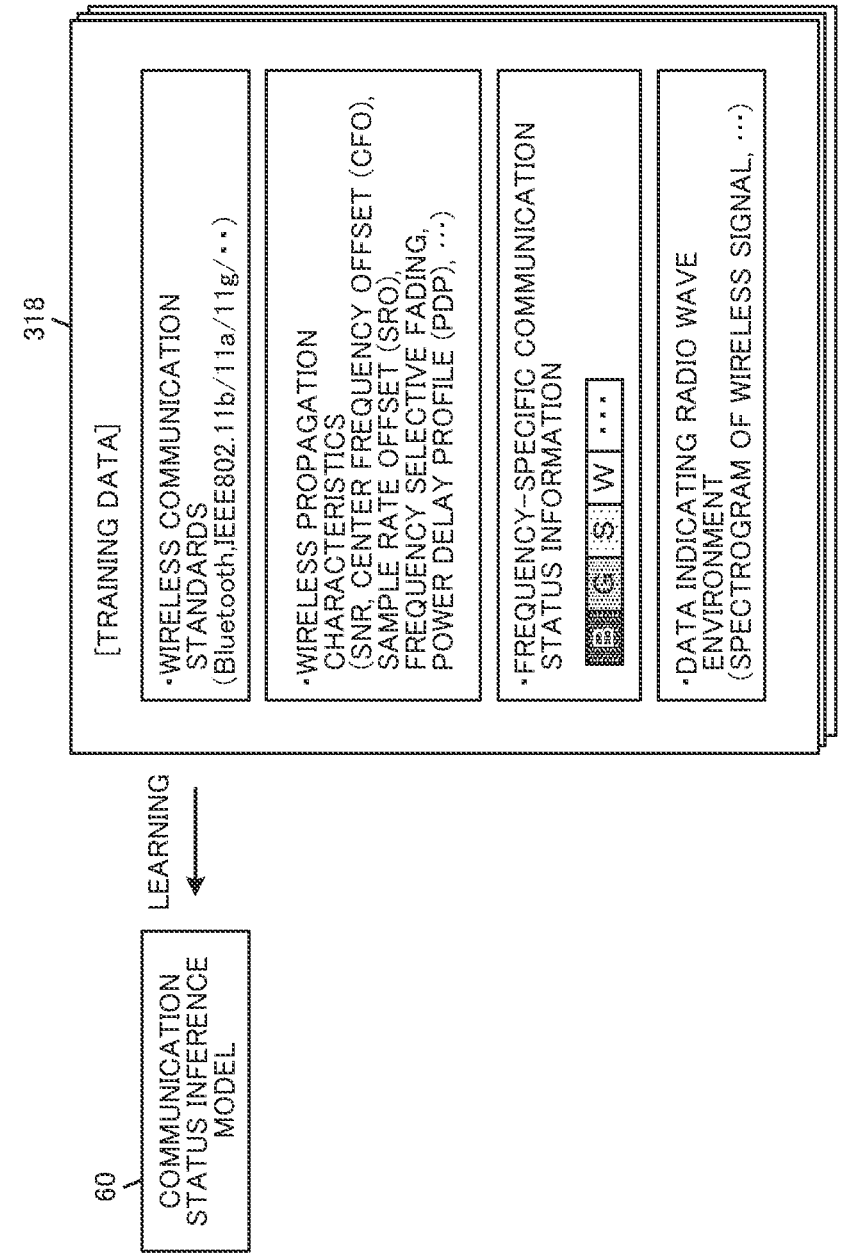
FIG. 4 is an explanatory diagram of learning of the communication status inference model.

FIG. 4 is a diagram describing learning (machine learning) of the communication status inference model 60 by the communication status inference apparatus 40. As illustrated in FIG. 4, the communication status inference model 60 is subjected to learning using a plurality of pieces of training data 318 prepared in advance. One piece of training data 318 has data indicating the radio wave environment of the wireless base station 10, the wireless communication standard used by the wireless base station 10 under the radio wave environment, the wireless propagation characteristic related to the wireless communication standard used by the wireless base station 10 under the radio wave environment, and the frequency-specific communication status information based on the SNR at which the wireless base station 10 performed wireless communication under the radio wave environment, which are associated with one another. The communication status inference model 60 is generated by learning with the first three data items (the data indicating the radio wave environment, the wireless communication standard, and the wireless propagation characteristic) as an input and with the last data item (the frequency-specific communication status information) as an output. The type of the learning is deep learning in the present embodiment, but may be any other type of machine learning.

The training data 318 can be generated by using actual wireless communication data or by performing a computer simulation. Specifically, the communication status inference apparatus 40 sets parameters for the wireless communication standard and the wireless propagation characteristic, and generates a transmission signal for transmission of arbitrary transmission data under the set wireless communication standard. Then, the communication status inference apparatus 40 determines a wireless signal that is assumed to be received by the wireless base station 10 when this transmission signal is transmitted via the wireless channel of the set wireless propagation characteristic. The communication status inference apparatus 40 calculates the spectrogram of the determined wireless signal or N pieces of data by normalizing the amplitude and phase of the wireless signal and subjecting to a fast Fourier transform, as the data indicating the radio wave environment. The communication status inference apparatus 40 also calculates the frequency-specific communication status information by determining the SNR of the transmission signal by frequency, from the spectrum of the wireless signal and the transmission signal. The communication status inference apparatus 40 sets the set parameters for the wireless communication standard and wireless propagation characteristic, the data indicating the radio wave environment, and the frequency-specific communication status information, as one piece of training data 318. Various parameters for the wireless communication standard and wireless propagation characteristic can be set to generate a large number of pieces of training data 318.

Figure 5:
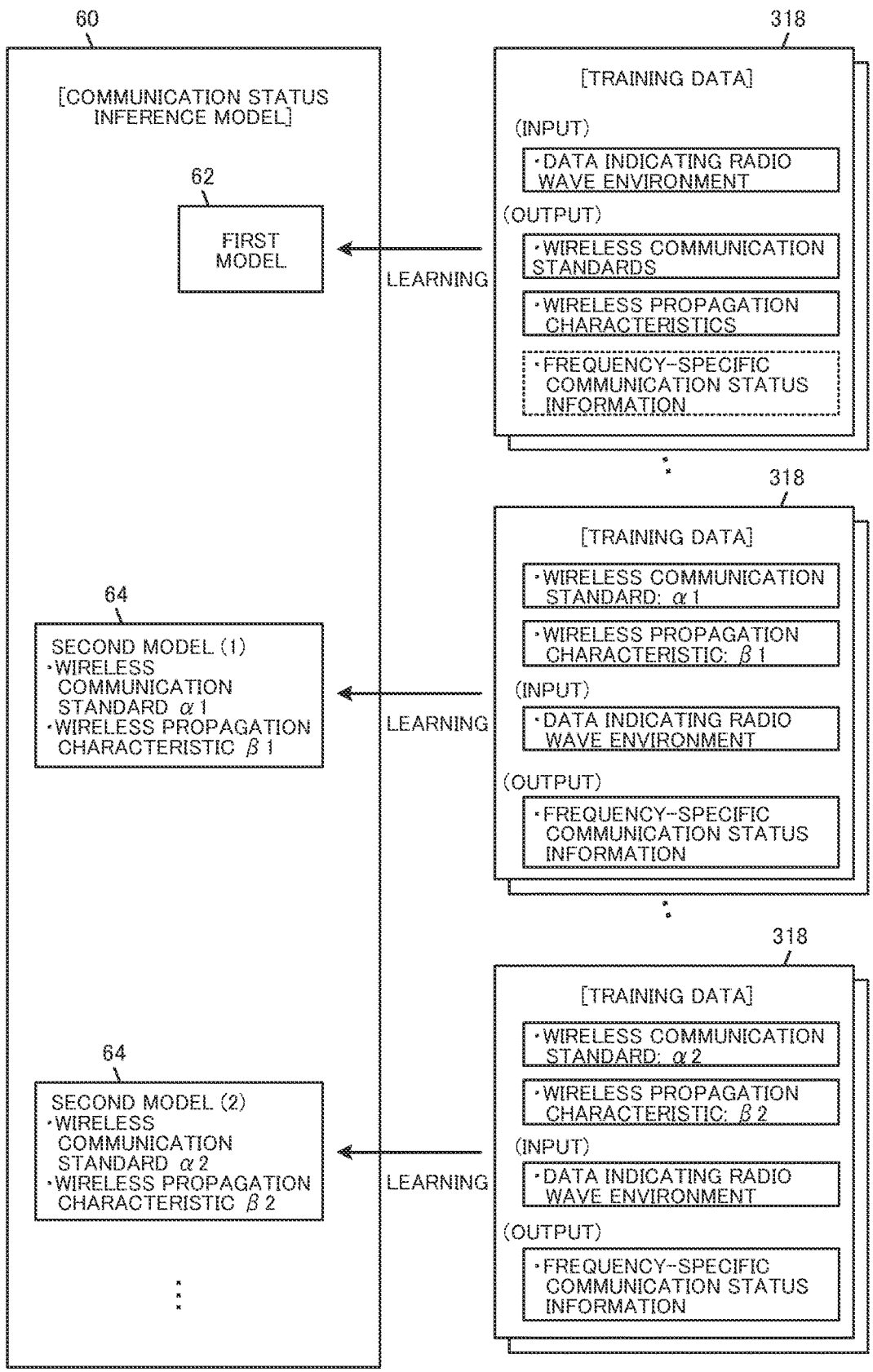
FIG. 5 is an explanatory diagram of learning of the communication status inference model.

As described above, the communication status inference model 60 has one first model 62 and a plurality of second models 64. Therefore, in detail, as illustrated in FIG. 5, each learning model with the first model 62 and the plurality of second models 64 is subjected to machine learning using the training data 318. That is, the first model 62 is subjected to learning with the data indicating the radio wave environment as an input and with the combination of the wireless communication standard and wireless propagation characteristic as an output. Each of the second models 64 is generated for each combination of wireless communication standard and wireless propagation characteristic. Thus, each of the second models 64 is subjected to learning with the data indicating the radio wave environment included in the training data 318 including the corresponding combination of wireless communication standard and wireless propagation characteristic as an input and with the frequency-specific communication status information as an output.

In more detail, all the pieces of prepared training data 318 are grouped by the combination of wireless communication standard and wireless propagation characteristic, and machine learning is performed using the training data 318 in the corresponding group, thereby to generate the second model 64 corresponding to the combination of the wireless communication standard and wireless propagation characteristic in the group. The first model 62 is generated by learning with the combination of the wireless communication standard and wireless propagation characteristic in each group as an output.

[Functional Configuration]

Figure 6:
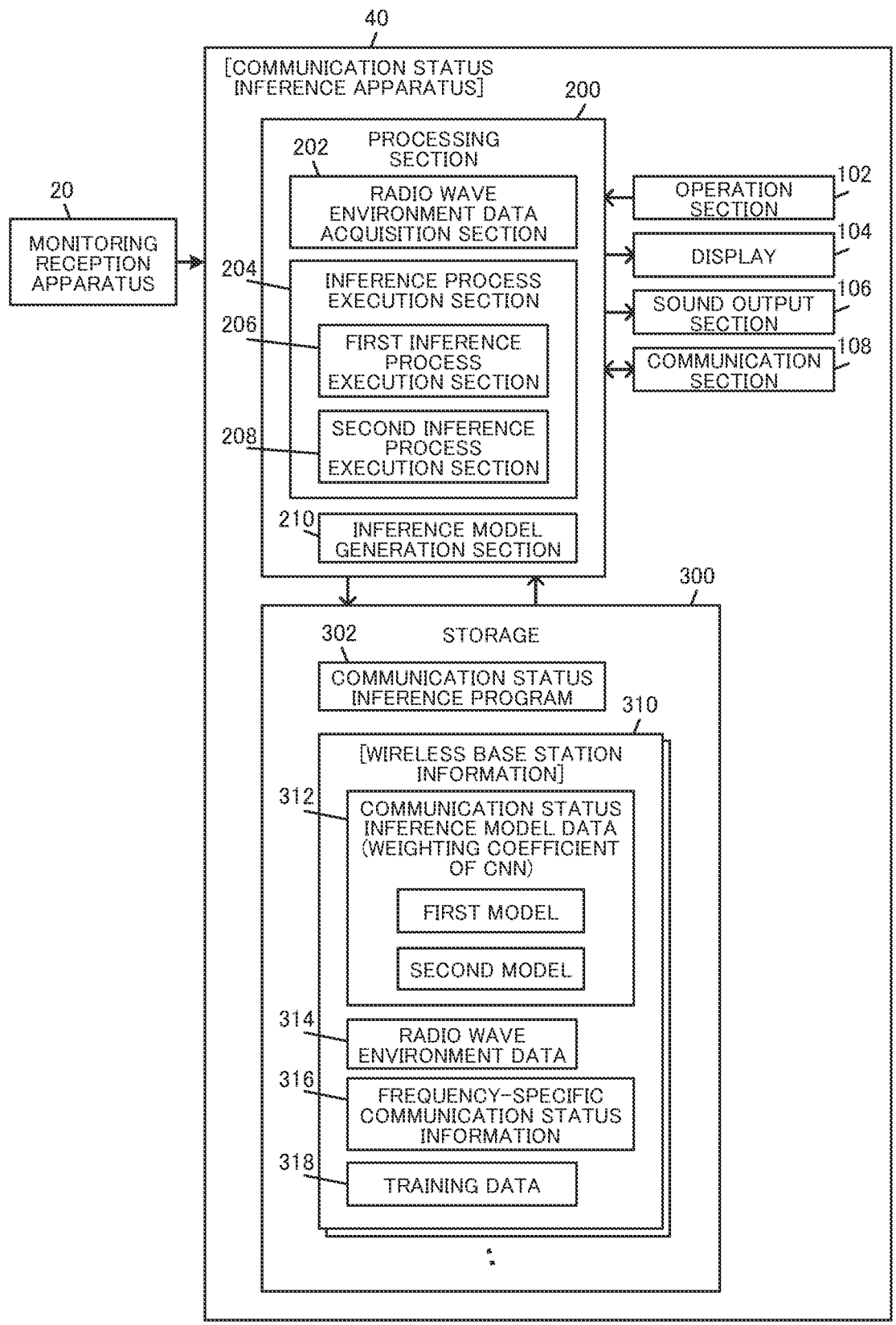
FIG. 6 is a diagram illustrating a functional configuration example of a communication status inference apparatus.

FIG. 6 is a functional configuration diagram of the communication status inference apparatus 40. According to FIG. 6, the communication status inference apparatus 40 includes an operation section 102, a display 104, a sound output section 106, a communication section 108, a processing section 200, and a storage 300. That is, the communication status inference apparatus 40 can constitute a computer system.

The operation section 102 is implemented by input apparatuses such as a keyboard, a mouse, a touch panel, and various switches, and outputs an operation signal corresponding to a received operation, to the processing section 200. The display 104 is implemented by a display device such as a liquid crystal display or touch panel, to provide various indications according to a display signal from the processing section 200. The sound output section 106 is implemented by a sound output device such as a speaker, for example, and provides various sound outputs in accordance with a sound signal from the processing section 200. The communication section 108 is implemented by a wired or wireless communication device, which is connected to the terrestrial transmission line N to communicate with various external apparatuses such as the wireless base stations 10 and the allocation apparatus 30.

The processing section 200 is a processor implemented by an arithmetic operation device or arithmetic operation circuit such as a central processing unit (CPU) or field programmable gate array (FPGA). The processing section 200 performs overall control of the communication status inference apparatus 40 based on programs and data stored in the storage 300, input data from the operation section 102, and others. The processing section 200 has, as functional processing blocks, a radio wave environment data acquisition section 202, an inference process execution section 204, and an inference model generation section 210. These functional parts included in the processing section 200 may be implemented software-wise by the processing section 200 executing programs or may be implemented by a dedicated arithmetic operation circuit. In the present embodiment, the functional parts are implemented software-wise.

The radio wave environment data acquisition section 202 acquires the data indicating the radio wave environment of the wireless base station 10 when the onboard system 52 and the wireless base station 10 installed along the railroad line perform cognitive wireless communication allowing for switching among the wireless communication standards. Specifically, the radio wave environment data acquisition section 202 acquires N pieces of data obtained by normalizing the amplitude and phase of a wireless signal received by the monitoring reception apparatus 20 installed in the vicinity of the wireless base station 10 and subjecting to a fast Fourier transform, as the data indicating the radio wave environment of the wireless base station 10.

The inference process execution section 204 performs an inference process of inputting the data indicating the radio wave environment acquired by the radio wave environment data acquisition section 202 to the communication status inference model 60 that is a machine learning model generated by the inference model generation section 210, and outputting the frequency-specific communication status information. The communication status inference model 60 includes the first model 62 that is the first learning model with the data indicating the radio wave environment as an input and with the combination of wireless communication standard and wireless propagation characteristic related to the wireless communication standard as an output, and the second models 64 that are second learning models for the corresponding combinations of wireless communication standard and wireless propagation characteristic with the data indicating the radio wave environment as an input and with the frequency-specific communication status information as an output.

The inference process execution section 204 also has a first inference process execution section 206 and a second inference process execution section 208.

The first inference process execution section 206 executes the first inference process of inputting the data indicating the radio wave environment acquired by the radio wave environment data acquisition section 202 to the first model 62 that is the first learning model, and outputting the combination of wireless communication standard and wireless propagation characteristic.

The second inference process execution section 208 executes the second inference process of selecting the second model 64 matching the combination of wireless communication standard and wireless propagation characteristic output by the first inference process execution section 206 from among the second models 64 that are the second learning models, inputting the data indicating the radio wave environment acquired by the radio wave environment data acquisition section 202 to the selected second model 64, and outputting the frequency-specific communication status information.

The inference model generation section 210 acquires the training data 318 in which the data indicating the radio wave environment of the wireless base station 10 when the onboard systems 52 and the wireless base station 10 installed along the railroad line perform cognitive wireless communication allowing for switching among the wireless communication standard, the frequency-specific communication status information based on the signal-to-noise ratio (SNR) at which the wireless base station 10 performed wireless communication under the radio wave environment, and the wireless propagation characteristic related to the wireless communication standard used by the wireless base station 10 under the radio wave environment are associated with one another, and uses the training data 318 to generate the communication status inference model 60 that is a machine learning model with the data indicating the radio wave environment as an input and with the frequency-specific communication status information as an output.

The communication status inference model 60 that is a machine learning model includes the first model 62 that is the first learning model and the second models 64 that are the second learning models for the corresponding combinations of wireless communication standard and wireless propagation characteristic related to the wireless communication standard. That is, the inference model generation section 210 provides learning using the training data 318 with the data indicating the radio wave environment as an input and with the combination of wireless communication standard and wireless propagation characteristic related to the wireless communication standard as an output, thereby to generate the first model 62 that is the first learning model. The inference model generation section 210 also provides learning using the training data 318 with the data indicating the radio wave environment as an input and with the frequency-specific communication status information as an output for the corresponding combinations of wireless communication standard and wireless propagation characteristic related to the wireless communication standard, thereby to generate the second models 64 that are the second learning models for the corresponding combinations of wireless communication standard and wireless propagation characteristic related to the wireless communication standard.

The storage 300 is implemented by an integrated circuit (IC) memory such as a read only memory (ROM) or a random access memory (RAM), and a storage device such as a hard disk. The storage 300 stores programs and data for the processing section 200 to perform centralized control of the communication status inference apparatus 40, and is used as a work area for the processing section 200 to temporarily store results of arithmetic operations executed by the processing section 200 and input data from the operation section 102. In the present embodiment, the storage 300 stores a communication status inference program 302 and wireless base station information 310.

The wireless base station information 310 is generated for each wireless base station 10 and stores, in association with the identification information of the corresponding wireless base station 10 (base station ID), communication status inference model data 312, radio wave environment data 314 that is data indicating the radio wave environment of the corresponding wireless base station 10 acquired by the radio wave environment data acquisition section 202, frequency-specific communication status information 316 of the corresponding wireless base station 10 inferred by the inference process execution section 204, and the training data 318 that is used for learning of the communication status inference model 60 by the inference model generation section 210.

The communication status inference model data 312 is data that defines the communication status inference model 60 for the corresponding wireless base station 10, and specifically, is data of weighting coefficient.

Operation and Advantageous Effects

According to the present embodiment, it is possible to realize a high-accuracy spectrum sensing technique that is applied to a wireless train control system performing cognitive wireless communication. That is, it is possible to generate the communication status inference model 60 that is a machine learning model with the data indicating the radio wave environment of the wireless base station 10 when the wireless base station 10 and the onboard system 52 in the wireless train control system 1 performs cognitive wireless communication as an input and with the frequency-specific communication status information based on the SNR at which the wireless base station 10 performed wireless communication under the radio wave environment as an output. It is also possible to realize a high-accuracy spectrum sensing technique using the communication status inference model 60 by executing an inference process on the communication status inference model 60 with the data indicating the radio wave environment of the wireless base station 10 as an input and with the frequency-specific communication status information based on the SNR at which the wireless base station 10 performed wireless communication under the radio wave environment as an output.

Note that applicable embodiments of the present disclosure are not limited to the embodiment described above, and that the foregoing embodiments can be modified as appropriate without deviating from the scope of the present disclosure.

(A) Monitoring Reception Apparatus 20

In the above-described embodiment, the monitoring reception apparatuses 20 are associated with the wireless base stations 10 on a one-to-one basis and are installed in the vicinity of the corresponding wireless base stations 10. Instead, the monitoring reception apparatuses 20 may be installed at arbitrary positions. In this case, for example, the communication status around each wireless base station 10 is inferred based on the wireless signal received by the monitoring reception apparatus 20 closest to the installation position of the wireless base station 10.

Alternatively, the wireless base stations 10 may also serve as the monitoring reception apparatuses 20. In this case, each of the communication status inference apparatuses 40 infers the communication status around the corresponding wireless base station 10 based on the wireless signal received by the wireless base station 10.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A learning model generation method executed by a computer system, the computer system executing:
acquiring training data in which (1) data indicating a radio wave environment of a wireless base station installed along a railroad line when an onboard system and the wireless base station perform cognitive wireless communication allowing for switching among wireless communication standards and (2) frequency-specific communication status information based on a signal-to-noise ratio (SNR) at which the wireless base station performed wireless communication under the radio wave environment are associated with each other; and generating a machine learning model using the training data, with the data indicating the radio wave environment as an input and with the frequency-specific communication status information as an output, wherein the radio wave environment of the wireless base station is determined based on a wireless signal received by a monitoring reception apparatus installed along the railroad line and in a vicinity of the wireless base station and indicating a communication status around the wireless base station.

2. A learning model generation method executed by a computer system, the computer system executing:
acquiring training data in which (1) data indicating a radio wave environment of a wireless base station installed along a railroad line when an onboard system and the wireless base station perform cognitive wireless communication allowing for switching among wireless communication standards and (2) frequency-specific communication status information based on a signal-to-noise ratio (SNR) at which the wireless base station performed wireless communication under the radio wave environment are associated with each other; and generating a machine learning model using the training data, with the data indicating the radio wave environment as an input and with the frequency-specific communication status information as an output, wherein the training data further includes associated wireless communication standards used by the wireless base station under the radio wave environment, the machine learning model includes a first learning model and second learning models for the corresponding wireless communication standards, and generating the machine learning model includes:
generating the first learning model using the training data, with the data indicating the radio wave environment as an input and with the wireless communication standards as an output; and generating the second learning models for the corresponding wireless communication standards using the training data, with the data indicating the radio wave environment as an input and with the frequency-specific communication status information as an output.

3. An inference apparatus comprising:
a radio wave environment data acquisition section that acquires data indicating a radio wave environment of a wireless base station installed along a railroad line when an onboard system and the wireless base station perform cognitive wireless communication allowing for switching among wireless communication standards; and an inference process execution section that executes an inference process of inputting the data indicating the radio wave environment acquired by the radio wave environment data acquisition section to a machine learning model that has undergone learning using training data with the data indicating the radio wave environment as an input and with frequency-specific communication status information based on a signal-to-noise ratio (SNR) at which the wireless base station performed wireless communication under the radio wave environment as an output, and outputting the frequency-specific communication status information, wherein the radio wave environment data acquisition section acquires the data indicating the radio wave environment, based on a wireless signal received by a monitoring reception apparatus installed along the railroad line and in a vicinity of the wireless base station, the radio wave environment indicating a communication status around the wireless base station.

4. An inference apparatus comprising,
a radio wave environment data acquisition section that acquires data indicating a radio wave environment of a wireless base station installed along a railroad line when an onboard system and the wireless base station perform cognitive wireless communication allowing for switching among wireless communication standards; and an inference process execution section that executes an inference process of inputting the data indicating the radio wave environment acquired by the radio wave environment data acquisition section to a machine learning model that has undergone learning using training data with the data indicating the radio wave environment as an input and with frequency-specific communication status information based on a signal-to-noise ratio (SNR) at which the wireless base station performed wireless communication under the radio wave environment as an output, and outputting the frequency-specific communication status information, wherein the training data further includes associated wireless communication standards used by the wireless base station under the radio wave environment, the machine learning model includes a first learning model and second learning models for the corresponding wireless communication standards, and the inference process execution section has:
a first inference process execution section that, using the training data, executes a first inference process of inputting the data indicating the radio wave environment acquired by the radio wave environment data acquisition section to the first learning model having undergone learning with the data indicating the radio wave environment as an input and with the wireless communication standard to be used by the wireless base station under the radio wave environment as an output, and outputting the wireless communication standard; and a second inference process execution section that, using the training data, executes a second inference process of selecting the second learning model matching the wireless communication standard output by the first inference process execution section from among the second learning models for the corresponding wireless communication standards having undergone learning for the corresponding wireless communication standards with the data indicating the radio wave environment as an input and with the frequency-specific communication status information as an output, inputting the data indicating the radio wave environment acquired by the radio wave environment data acquisition section to the selected second learning model, and outputting the frequency-specific communication status information.

5. The inference apparatus as defined in claim 4, wherein the training data further includes associated wireless propagation characteristics according to the wireless communication standards used by the wireless base station under the radio wave environment, the second learning models are present for corresponding combinations of the wireless communication standard and the wireless propagation characteristic, the first learning model is a model that has undergone learning with the data indicating the radio wave environment as an input and with the wireless communication standards used by the wireless base station under the radio wave environment and the wireless propagation characteristics according to the wireless communication standards as an output, the first inference process execution section executes the first inference process of inputting the data indicating the radio wave environment acquired by the radio wave environment data acquisition section to the first learning model and outputting a combination of the wireless communication standard and the wireless propagation characteristic, and the second inference process execution section executes the second inference process of selecting the second learning model matching the combination output by the first inference process execution section, inputting the data indicating the radio wave environment acquired by the radio wave environment data acquisition section to the selected second learning model, and outputting the frequency-specific communication status information.

6. The inference apparatus as defined in claim 3, wherein the machine learning model is a convolution neural network.

7. The inference apparatus as defined in claim 4, wherein the radio wave environment data acquisition section acquires the data indicating the radio wave environment, based on a wireless signal received by a monitoring reception apparatus installed along the railroad line.

8. The inference apparatus as defined in claim 5, wherein the radio wave environment data acquisition section acquires the data indicating the radio wave environment, based on a wireless signal received by a monitoring reception apparatus installed along the railroad line.

9. A wireless train control system comprising:

the inference apparatus as defined in claim 3; and an allocation apparatus that dynamically allocates a wireless channel related to the cognitive wireless communication, based on the frequency-specific communication status information output from the inference process execution section of the inference apparatus.

* * * * *